(12) United States Patent
Durkin

(10) Patent No.: US 6,647,099 B1
(45) Date of Patent: Nov. 11, 2003

(54) ADMINISTRATIVE CONTROL AND SECURITY OF MODEMS

(75) Inventor: David P. Durkin, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/327,896

(22) Filed: Jun. 8, 1999

Related U.S. Application Data

(60) Provisional application No. 60/088,449, filed on Jun. 8, 1998.

(51) Int. Cl.[7] .............................................. H04M 11/00
(52) U.S. Cl. .................................. 379/93.02; 379/93.05
(58) Field of Search ........................... 379/88.22–88.23, 379/90.01, 93.01–93.02, 93.05–93.06, 93.09, 93.11, 93.34, 100.15–100.16, 201.01, 201.02, 201.03, 207.02, 207.03, 207.11, 210.02, 902–903, 100.01, 142.06; 370/341, 431; 358/400; 340/825.5

(56) References Cited

U.S. PATENT DOCUMENTS

| | | | | |
|---|---|---|---|---|
| 4,546,213 A | | 10/1985 | Dick ........................... 179/2 A |
| 4,680,773 A | | 7/1987 | Amundson ..................... 375/8 |
| 4,850,008 A | * | 7/1989 | Berg et al. .................. 358/400 |
| 4,905,281 A | | 2/1990 | Surjaatmadja et al. ........ 380/25 |
| 4,958,153 A | * | 9/1990 | Murata et al. ............ 340/825.5 |
| 5,048,076 A | * | 9/1991 | Maurer et al. .......... 379/100.15 |
| 5,081,621 A | | 1/1992 | Sugimoto ................. 370/85.13 |
| 5,131,025 A | | 7/1992 | Hamasaki ..................... 379/95 |
| 5,146,472 A | | 9/1992 | Hallman ........................ 375/8 |
| 5,153,918 A | | 10/1992 | Tuai ............................. 380/25 |
| 5,276,687 A | * | 1/1994 | Miyamoto ................... 370/420 |
| 5,313,653 A | * | 5/1994 | Sasuta .......................... 455/17 |
| 5,436,957 A | * | 7/1995 | McConnell ................. 379/196 |
| 5,440,619 A | * | 8/1995 | Cann ..................... 379/100.16 |
| 5,471,522 A | * | 11/1995 | Sells et al. ............... 379/93.11 |
| 5,481,562 A | | 1/1996 | Pearson et al. ............. 375/222 |
| 5,483,596 A | | 1/1996 | Rosenow et al. ............. 380/25 |
| 5,495,483 A | * | 2/1996 | Grube et al. ................. 340/2.1 |
| 5,499,287 A | * | 3/1996 | Beck et al. ............. 379/100.01 |
| 5,724,426 A | | 3/1998 | Rosenow et al. ............. 380/25 |
| 5,761,288 A | * | 6/1998 | Pinard et al. .......... 379/201.03 |
| 5,815,682 A | * | 9/1998 | Williams et al. .............. 703/25 |
| 5,864,710 A | | 1/1999 | Sands et al. ................. 395/825 |
| 5,878,142 A | | 3/1999 | Caputo et al. ................ 380/25 |
| 6,298,122 B1 | * | 10/2001 | Horne ................... 379/142.06 |

* cited by examiner

*Primary Examiner*—George Eng

(57) ABSTRACT

A modem or modem driver includes the ability to individually enable or disable inbound data, outbound data, inbound fax, outbound fax, inbound voice, and outbound voice. These capabilities may be individually enabled or disabled by an administrator thereby controlling and authorizing user operations. In one embodiment, a bit mask representing permission states is stored in modem associated memory. Each feature has an assigned bit in the bit mask. The modem associated memory may be RAM, ROM, EPROM, EEPROM or flash ROM. When the modem memory is flash ROM the states may be changed by an administrator via software.

33 Claims, 7 Drawing Sheets

| NOT USED | NOT USED | INBOUND DATA | INBOUND DATA | INBOUND FAX | OUTBOUND FAX | INBOUND VOICE | OUTBOUND VOICE |
|---|---|---|---|---|---|---|---|
|  |  | 1 | 0 | 1 | 0 | 1 | 1 |

FIG. 2

ADMINISTRATIVE CONTROL AND SECURITY OF MODEMS

This Application claims the benefit of the filing date of U.S. Provisional Patent Application Ser. No. 60/088,449 filed Jun. 8, 1998, which is hereby incorporated by reference.

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The present invention relates to software modems and more specifically to establishing classes of services (COS) for individual users and/or groups of users within an organization.

2. Description of the Related Art

A modem is a device that has traditionally allowed a computer system to transmit and receive data over a telephone line. Today, many modems can transmit voice and fax as well as data. Modems are currently implemented in a variety of ways. For example, a host based "controllerless" modem typically includes a codec on a peripheral board, but the modem controller code is executed by a host processor. A native signal processing modem typically implements a signal processing component on the host system itself to generate modem signals. Peripheral modems are implemented in a variety of ways, including both the use of a digital signal processor in conjunction with a modem microcontroller, and a strictly digital signal processor oriented approach. All of these approaches, however, provide for code that is either executed by the host processor, the microcontroller on the modem itself, or the digital signal processing code to implement the modem functionality. These approaches necessarily enhance the flexibility of modems, especially when this code is implemented in a flash ROM. This is because the modem can be reconfigured to adapt it to new implementations of communication protocols and to add other features that may be desirable in the modem.

While modem interfaces are standardized a number of different communications protocols for formatting data, to be transmitted over telephone lines, exist. For example, standardized communication protocols include: Bell 103, CCITT V.21, Bell 212A, ITU V.22, ITU V.22bis, ITU V.29, ITU V.32, ITU V.32bis, ITU V.34, and ITU V.90. These and other protocols are well known to those of ordinary skill in the art. In many modems, flash ROMS have been utilized to enable the upgrading of communication protocols.

Telephony is the science of translating sound into electrical signals transmitting them through a medium and then converting back to sound. Computer telephony integration (CTI) refers to computer systems that enable a computer to act as a call center accepting incoming calls and routing them to the appropriate device or user. Currently, CTI systems have advanced such that most are capable of handling incoming and outgoing communications that include: phone calls (voice), faxes, and Internet messages. The advance in CTI has, in part, been aided by advances in software interfaces. One such interface is telephony application program interface (TAPI). TAPI is an application programmer interface (API) designed to connect a computer system running a windows-based program or operating system to telephone services. TAPI is well known to those of ordinary skill in the art. Another interface that is of particular interest to device driver developers is telephony service provider interface (TSPI). The TSPI is a software interface that sets between a Windows telephony dynamic link library (DLL) and a hardware specific device driver that is also known as a telephony service provider (TSP). The TSP provides an interface to the telephony hardware. The TSPI is well known to those of ordinary skill in the art.

In a typical local area network (LAN) a network firewall determines which LAN services are available from outside of the LAN and what outside services are available to those internally connected to the LAN. For the network firewall to be effective all outside traffic must pass through the firewall where it can be inspected. When performing as designed, the firewall permits only authorized traffic to pass and blocks dubious traffic. Unfortunately, the firewall cannot offer any protection once an attacker has gotten through or around the firewall. For example, if unrestricted dial-out is permitted from inside the protected network internal users can make a direct serial line internet protocol (SLIP) or point-to-point protocol (PPP) connection to an internet service provider (ISP). These types of connections bypass the security provided by even the most carefully constructed firewall and create a significant opportunity for backdoor attacks.

SUMMARY OF THE INVENTION

The system according to the invention implements a modem or modem driver with a variety of desirable features. These features include the ability to individually enable or disable inbound data, outbound data, inbound fax, outbound fax, inbound voice, and outbound voice. These capabilities may be individually enabled or disabled by an administrator thereby controlling and authorizing user operations. In one embodiment a bit mask representing permission states is stored in modem associated memory. Each feature has an assigned bit in the bit mask. This modem associated memory may be RAM, ROM, EPROM, EEPROM or flash ROM. When the modem memory is flash ROM the states may be changed by an administrator via software.

BRIEF DESCRIPTION OF THE DRAWINGS

FIG. 2 shows a bit mask which corresponds to individual permissions according to an embodiment of the invention;

DETAILED DESCRIPTION OF INVENTION

Figure 1:
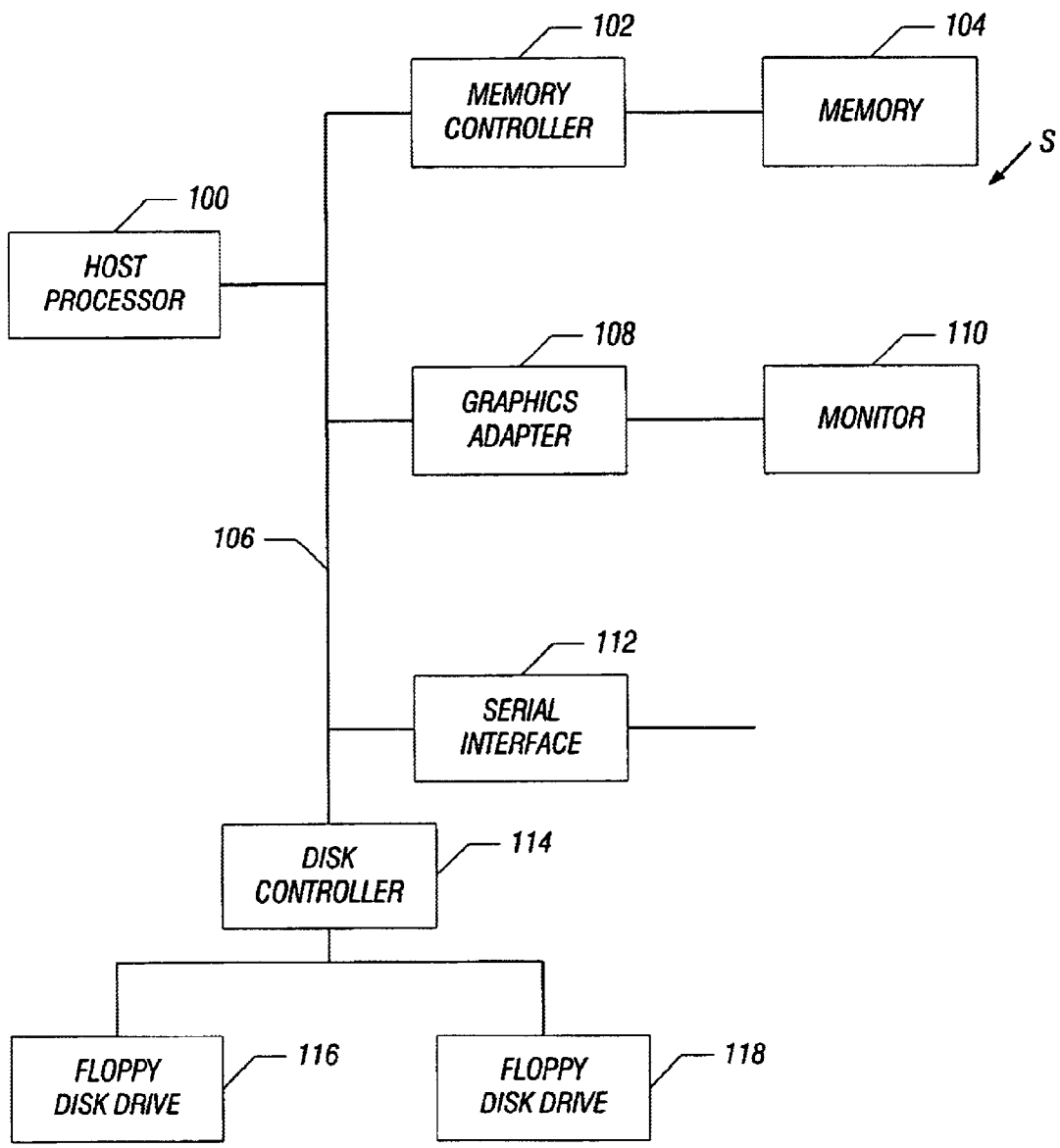
FIG. 1 illustrates a typical computer system S implemented according to an embodiment of the invention.

Turning to FIG. 1, illustrated is a typical computer system S implemented according to the invention. While the system S is illustrative of one embodiment, techniques according to the invention can be implemented in a wide variety of systems. As illustrated, a host processor 100 is coupled to a memory controller 102, a graphics adapter 108, a serial interface 112, and a disk controller 114 through a bus 106. For simplicity, various circuitry that would be necessary to couple these components is not illustrated.

The host processor 100 can be a Pentium® (manufactured by Intel Corporation) or any other appropriate processor. The memory controller 102 controls system memory 104. The system memory 104 would include dynamic random access memory (DRAM) appropriate for a given processor. The computer system S utilizes Flash read only memory (ROM) (not shown) to implement the preferred embodiment of the invention. The graphics adapter 108 is coupled to a monitor 110. Again, the particular graphics adapter 108 and monitor 110 are not critical to the invention. The disk controller 114 controls floppy disks disk drive 116 and hard disk drive 118. The serial interface 112 couples the computer system S to a telephone line. The serial interface 112 may couple the computer system S to the telephone line directly (in the case of a software modem) or couple the computer system S to a modem (not shown). In the latter configuration, the modem will in turn couple the computer system S to the telephone line.

A software or firmware based modem typically allows for enhanced operating system compared to a hardware modem. This is because using software enables permissions to be set in order to establish a COS for an individual user and/or groups of users within an organization. Permissions are individual privileges assigned to a user or a group of users, which allow or disallow for a specific operation. Permissions may be established in order to establish security requirements or otherwise control usage of enterprise resources to promote good business practices. Utilizing permissions for added security can result in a flexible back-up firewall. For example, when outbound data calls are not permitted no communication application package can establish outbound data communications. Utilizing permissions in this manner allow an individual feature to be disabled at the lowest level—that is in a modem's hardware, firmware or driver-stack.

Permissions can be set via a stand-alone utility or through an embedded software flash utility. In one embodiment, an administrator can set various permissions remotely via a centralized location. For example, the administrator might utilize System Management Server (SMS), Policy Editor, Insight Manager, Carbon Copy, PC Anywhere or any other facility that provides remote access. These and other tools that assist the administration of LANs are well known to those of ordinary skill in the art. When embedded into intelligent applications creative features which can augment system command and control may be implemented. For example, modem resources could be shut down in real time when a problem occurs by toggling one or more permission bits.

Turning to FIG. 2, illustrated is a bit mask which corresponds to individual permissions. While this bit mask is illustrated to be 8 bits it could, of course, be smaller such as a nibble (4 bits) if some features are not needed. For example, a nibble would allow for inbound and outbound data and fax call control. A '1' enables a feature, and a '0' disables a feature. The illustrated example of FIG. 2 allows inbound data, inbound fax, inbound voice, and outbound voice and disables outbound data and outbound fax. This effectively establishes a COS for an individual user. Because the bit mask, in the preferred embodiment, is located in flash memory it can be controlled through software. This modem firmware embodiment enables or disables the features associated with the bit mask at the lowest point. All third party communication applications are governed by the permission settings.

Figure 3:
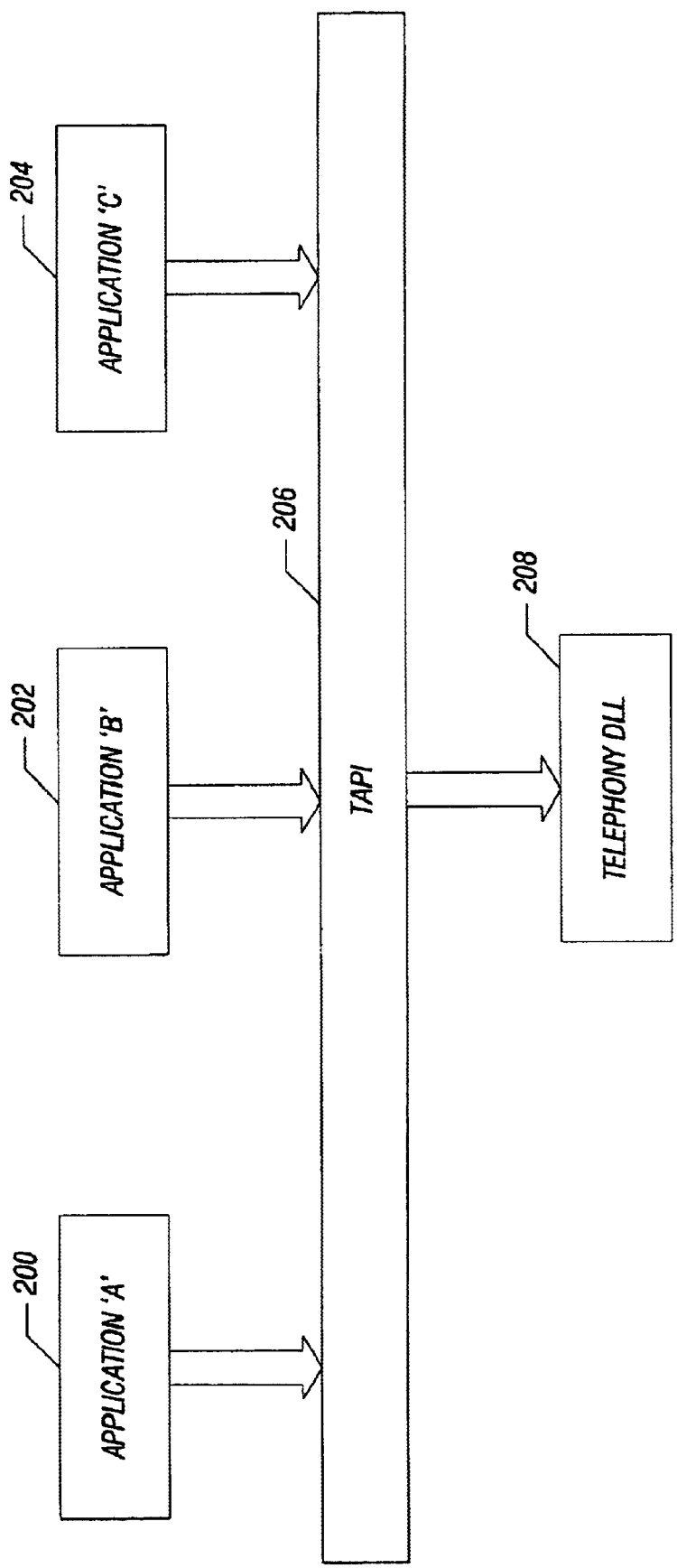
FIG. 3 depicts an example of how an application running on a computer system S interacts with a TAPI.

Moving to FIG. 3, illustrated is a typical example of how an application 200, 202, 204 running on a computer system S interacts with a TAPI 206. The applications 200–204 are shown as being coupled to the TAPI 206 and isolated from the telephony dynamic link library (DLL) 208. This isolation simplifies the installation and support of PC based communication software. Traditionally communication software has been complex to install and difficult to support because the application 200–204 would have to be able to communicate with the telephony hardware directly. This means that the application 200–204 would potentially have to know hundreds of different modem types or the user would have to carry out a complex installation process. Using the TAPI 206 any TAPI compatible application can utilize a hardware driver coupled to a telephony DLL 206.

Figure 4:
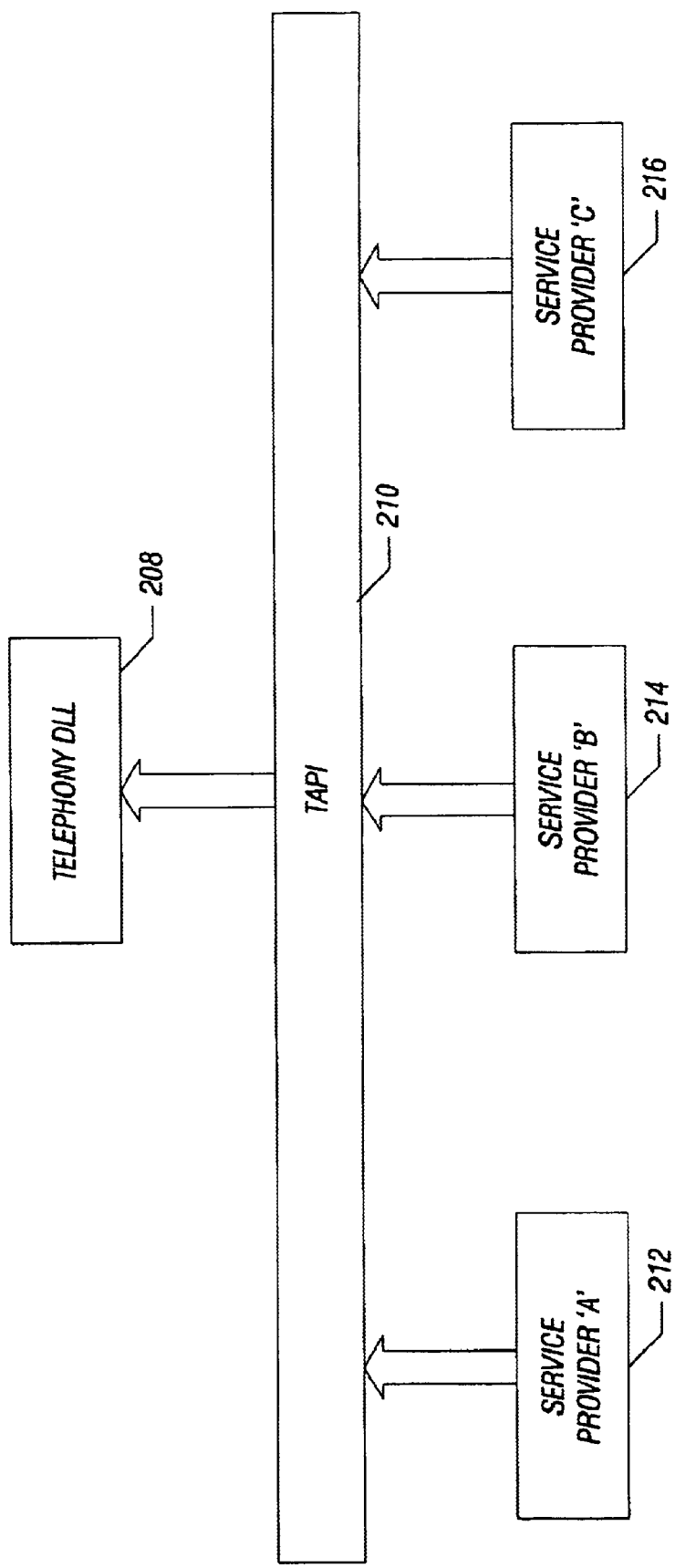
FIG. 4 illustrates the connection between a TSPI and a telephony DLL.

A second interface, a telephony service provider interface (TSPI) is also a software interface. The TSPI resides between a Windows telephony DLL and what are known as telephony service providers (TSPs). The TSPs are hardware specific device drivers, which provide the interface to the telephony hardware. When one of the TSPs is coupled to a modem that TSP can function to translate a TSPI request, for example, to a number to be dialed. FIG. 4 illustrates the connection between a TSPI 210 and a telephony DLL 208. As previously stated, TSPs 212, 214 and 216 are hardware specific drivers.

Figure 5:
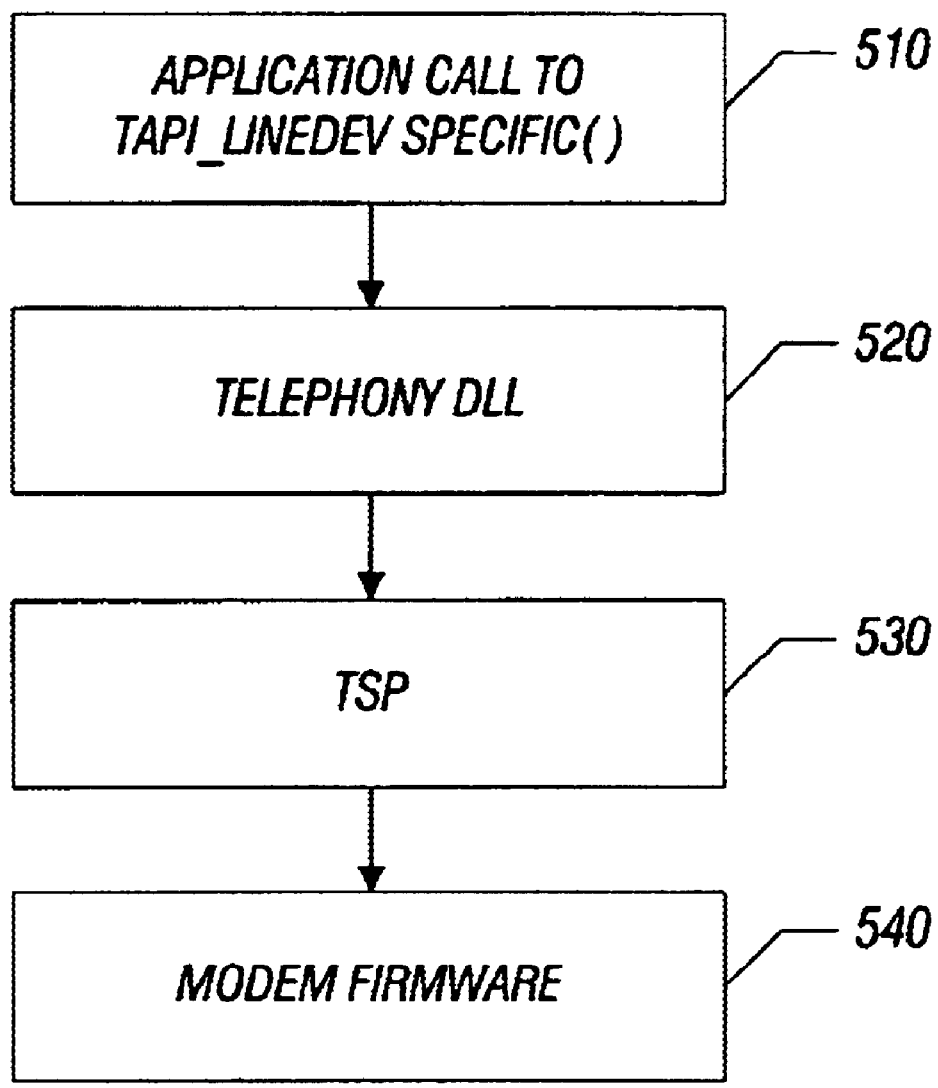
FIG. 5 depicts command flow through the TAPI.

The control of flow through the TAPI 206 is further illustrated in FIG. 5. One of the applications 200–206 places a call to the TAPI layer 206 via the TAPI_LINEDEV SPECIFIC( ) routine. A unique identifier is translated by the appropriate TSP 212–216. The identifier corresponds to an action requested. That action might include the identifier to enable fax in, disable fax in, enable fax receive, disable fax receive, enable data send, disable data send, enable data receive, or disable data receive. Windows passes the call from the application 200–206 through the TAPI DLL 208 to the TSP 212–216. The TSP 212–216 is entered and the identifier is read. The TSP 212–216 then issues an appropriate command to the modem firmware 218. The modem firmware 218 interprets the command and toggles the permission bit mask and flash memory, as appropriate. The modem firmware 218 acknowledges the appropriate TSP 212–216 which in turn eventually acknowledges the appropriate application 200–204.

There are several other ways in which administrative control can be implemented. Registry settings may be used to control the enabling and disabling of the permission bits. This is accomplished by writing a zero or a one, "true"/ "false", "yes"/"no", "on"/"off", or other appropriate value to the specific permission bit. For example, a value of zero would be used to disable a feature and a value of one would be used to enable the same feature. Such registry values could appear as:

```
My Computer
    HKEY_LOCAL_MACHINE
        Security
            Modem
                Data_receive      0×1
                Data_transmit     0×1
                Fax_receive       0×1
                Fax_transmit      0×1
                Voice_transmit    0×1
                Voice_receive     0×1
```

Security aware applications can poll these keys and dynamically set and reset the permissions via the TAPI or using direct calls to the firmware. Assuming such an application or utility is available to an administrator, the administrator can dynamically issue commands to the firmware. As previously discussed, administrators can use the Policy Editor employed on NT systems, SMS, PC Anywhere, or Carbon Copy to change these values. In addition COS groups can also be associated with server based installation of product software. Utilizing SMS, package definition files (PDF), will also allow the administrator to establish different classes of services for different users. For example, the administrator could create an installation folder on a server with the PDF COS for the sales group and a different PDF COS for the marketing group.

In another embodiment, a flash utility can also be used to send commands directly to the modem firmware via proprietary commands. These commands would be dependent on the architecture used by the designer. Upon launch of the application a simple graphical user interface (GUI) or character based interface prompts the user to enter a password. Upon successful entry the administrator can change the password or select appropriate check boxes. This utility would be particularly usefull for local client administration.

Figure 6:
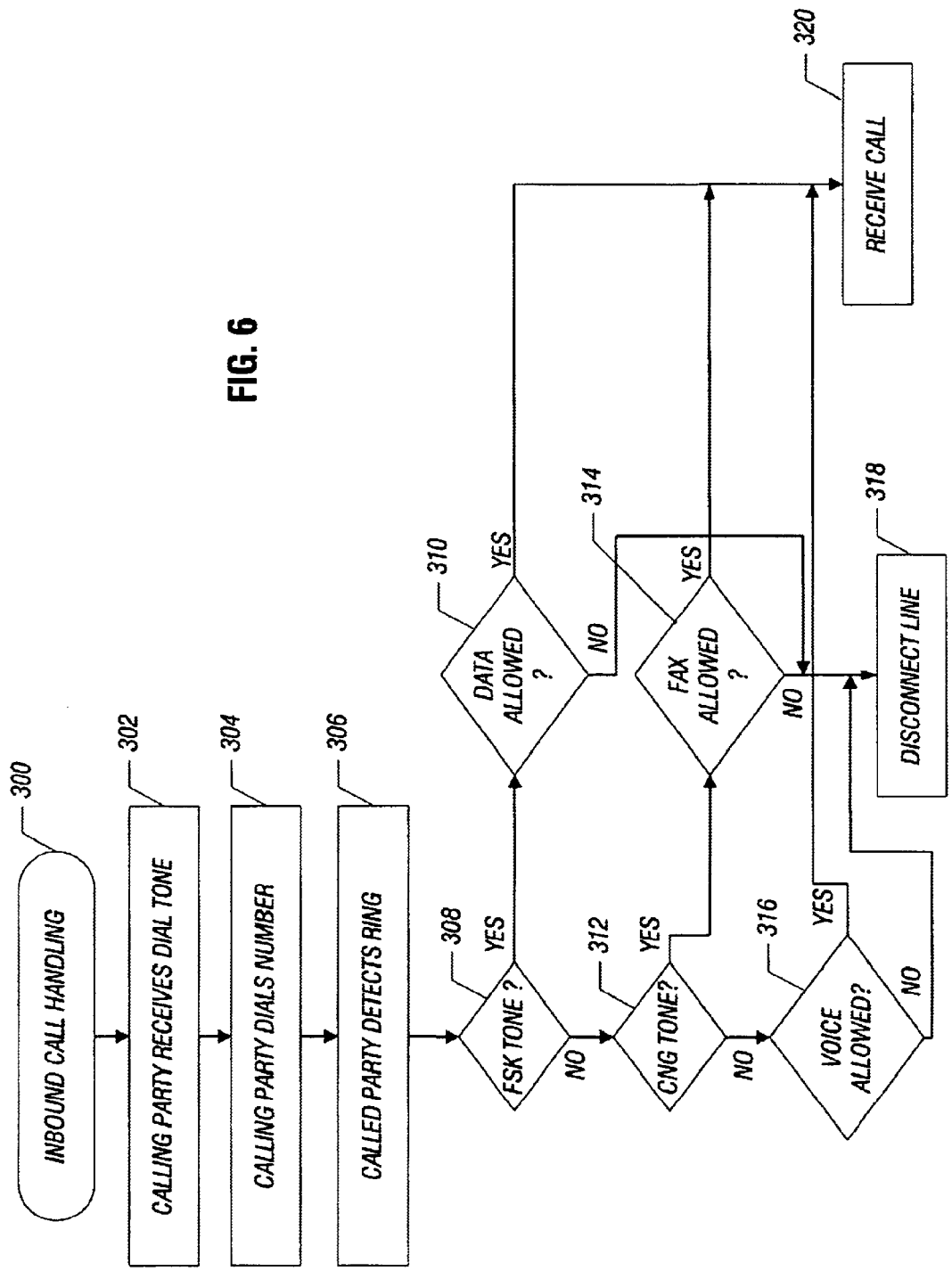
FIG. 6 shows an inbound call handling routine that is invoked when a calling party wishes to place a call to a modem user.

On telephone lines call discrimination is typically performed when a connection is made between a called party and a calling party. Turning to FIG. 6, illustrated is an inbound call handling routine 300 that is invoked when a calling party wishes to place a call to a modem user. In step 302 a calling party goes off hook and receives a dial tone. From step 302 control passes to step 304. In step 304 the calling party dials the number of the called party and hears a ringback. From step 304 control passes to 306. In step 306 the called party detects an inbound ring and answers. Control then passes to step 308. In step 308 the called party's modem discriminator detects whether there is a FSK tone. If the called party's modem detects a FSK tone then control passes to step 310.

The FSK tone is indicative of a data call. In step 310 the inbound data permissions are read. If inbound data calls are allowed control passes to step 320, where the call is received. If inbound data calls are not allowed then control passes to step 318, where the line is disconnected. From step 308, when the called party's modem does not detect an FSK tone control passes to step 312. In step 312 the called party's modem detects whether there is a CNG tone, a fax answer tone, or fax training tones. All of these tones are indicative of a fax call. If a CNG tone exists control passes to step 314. In step 314 the inbound fax permissions are read. If an inbound fax call is allowed control passes to step 320. In step 320 the inbound fax is received. If the inbound fax calls are not allowed control passes from step 314 to step 318, where the line is disconnected. If the CNG tone is not detected in step 312 control passes to step 316. It is assumed in step 316 that the call is a voice call. If the voice call is allowed then control passes to step 320, where the inbound voice call is received. Otherwise, control is passed to step 318 where the line is disconnected.

Note that although the modem discriminator is shown as sequentially detecting the FSK and the CNG incoming signals, in actual practice this is typically done simultaneously.

Figure 7:
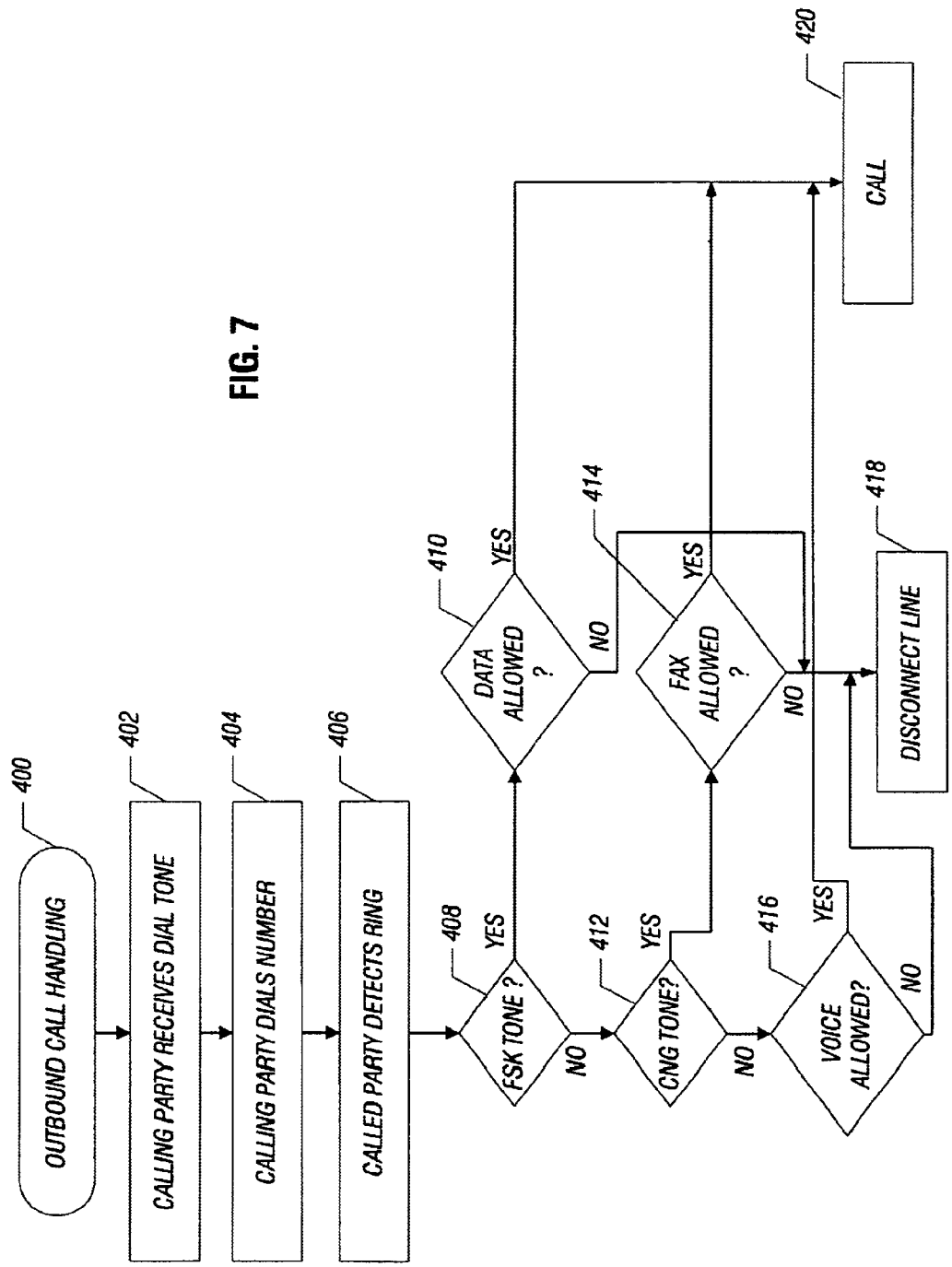
FIG. 7 illustrates a procedure for handling outbound calls.

Turning to FIG. 7, illustrated is an outbound call handling routine 400. This procedure is very similar to the inbound call handling routine 300. In this routine 400 a calling party is the modem user. In step 402 the calling party places the modem off-hook and receives a dial-tone. From step 402 control passes to step 404. In step 404 the calling party dials the number of the called party and determines when the modem detects ringback. From step 404 control passes to step 406. In step 406 the called party detects a ring and goes off-hook or answers. In step 408 if the calling party's modem detects FSK tones then the outbound data permissions are read and control passes to step 410. In step 410 if outbound data calls are allowed control passes to step 420 where the call is permitted. If a FSK tone is not detected in step 408 control transfers to step 412. In step 412 the calling party's modem detects whether a CNG tone (or fax answer or training tone) exists. If the CNG tone exists then control is transferred to step 414. In step 414 the outbound fax permissions are read and if outbound fax calls are allowed control passes to step 420. In step 420 the outbound fax call is permitted to proceed. If outbound faxes are not allowed then control transfers to step 418 where the line is disconnected. If a CNG tone is not detected in step 412 control transfers to step 416. In step 416 an outbound voice call is assumed and the outbound voice permissions are read. If outbound voice calls are allowed control transfers to step 420. If outbound voice calls are not allowed the modem disconnects the line in step 418.

Although the disclosed embodiment is principally directed to a software modem, such as a controllerless modem implemented on a host system or a digital signal processor, the techniques according to the invention could be similarly implemented employing a modem driver in conjunction with a standard hardware modem that supports telephony features. For example, the modem driver capable of intercepting modem communications at a very low level could include the data, fax, and voice permissions, and disconnect calls that did not meet the required permissions. Preferably, for heightened security the ability to selectively allow or disallow different types of ingoing and outgoing modem calls is implemented at a firmware level within either a host system or the modem itself. In an environment where security is not of paramount importance, or where it is known that the operating system executing on the computer is extremely secure, the selective passing of desired types of calls could be implemented at the driver level.

Also, although the present modem has been disclosed as being implemented with an analog line modem, the examples given could similarly be used on BRI ISDN, PRI ISDN, or other digital transports as well.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method for limiting the availability of a telephony service, the method comprising:

detecting a request for a type of telephony service on a phone line at a modem coupled to the phone line;

determining if the requested type of telephony service is permitted, responsive to a predetermined user-independent permission data associated with the modem;

terminating the request for the type of telephony service at the modem when the telephony service is not permitted; and disconnecting the phone line responsive to terminating the request for the type of telephony service.

2. The method of claim 1, wherein the type of telephony service includes incoming data, fax and voice.

3. The method of claim 1, wherein the type of telephony service includes incoming and outgoing data, fax and voice.

4. The method of claim 1, wherein the type of telephony service is a data call which is indicated by an FSK tone.

5. The method of claim 1, wherein the type of telephony service is a fax call which is indicated by a CNG tone, a fax answer tone, or a fax training tone.

6. The method of claim 1, wherein the type of telephony service is a voice call which is indicated if an FSK tone, CNG tone, a fax answer tone, or fax training tone is not detected.

7. The method of claim 1, wherein the determination of whether the requested type of telephony service is permitted is accomplished by reading a permission bit associated with the requested type of telephony service.

8. The method of claim 7, wherein the permission bit is located in a flash ROM.

9. The method of claim 8, wherein the state of the permission bit can be remotely changed by an administrator via software.

10. The method of claim 1, further comprising:
    setting the predetermined user-independent permission data.

11. The method of claim 10, setting the predetermined user-independent permission data comprising:
    determining a user-dependent permission data; and
    storing the user-dependent permission data as the predetermined user-independent permission data.

12. A computer system that includes the capability of limiting the availability of a telephony service, the computer system comprising:
    a processor;
    a mass storage system coupled to the processor; and
    a processor readable code, stored in the mass storage system, for causing the processor to perform:
        detecting a request for a type of telephony service on a phone line at a modem coupled to the phone line;
        determining if the requested type of telephony service is permitted, responsive to a predetermined user-independent permission data associated with the modem;
        terminating the request for the type of telephony service at the modem when the telephony service is not permitted; and
        disconnecting the phone line responsive to terminating the request for the type of telephony service.

13. The computer system of claim 12, wherein the type of telephony service includes incoming data, fax and voice.

14. The computer system of claim 12, wherein the type of telephony service includes incoming and outgoing data, fax and voice.

15. The computer system of claim 12, wherein the type of telephony service is a data call which is indicated by an FSK tone.

16. The computer system of claim 12, wherein the type of telephony service is a fax call which is indicated by a CNG tone, a fax answer tone, or a fax training tone.

17. The computer system of claim 12, wherein the type of telephony service is a voice call which is indicated if an FSK tone, CNG tone, a fax answer tone, or fax training tone is not detected.

18. The computer system of claim 12, wherein the determination of whether the requested type of telephony service is permitted is accomplished by reading a permission bit associated with the requested type of telephony service.

19. The computer system of claim 18, wherein the permission bit is located in a flash ROM.

20. The computer system of claim 19, wherein the state of the permission bit can be remotely changed by an administrator via software.

21. The computer system of claim 12, the processor readable code further comprising code for causing the processor to perform:
    setting the predetermined user-independent permission data.

22. The computer system of claim 21, setting the predetermined user-independent permission data comprising:
    determining a user-dependent permission data; and
    storing the user-dependent permission data as the predetermined user-independent permission data.

23. A modem that includes the capability of limiting the availability of a telephony service, the modem comprising:
    a microcontroller;
    a memory system coupled to the microcontroller; and
    a microcontroller readable code, stored in the memory system, for causing the microcontroller to perform:
        detecting a request for a type of telephony service on a phone line at the modem;
        determining if the requested type of telephony service is permitted, responsive to a predetermined user-independent permission data associated with the modem;
        terminating the request for the type of telephony service at the modem when the telephony service is not permitted; and
        disconnecting the phone line responsive to terminating the request for the type of telephony service.

24. The modem of claim 23, wherein the type of telephony service includes incoming data, fax and voice.

25. The modem of claim 23, wherein the type of telephony service includes incoming and outgoing data, fax and voice.

26. The modem of claim 23, wherein the type of telephony service is a data call which is indicated by an FSK tone.

27. The modem of claim 23, wherein the type of telephony service is a fax call which is indicated by a CNG tone, a fax answer tone, or a fax training tone.

28. The modem of claim 23, wherein the type of telephony service is a voice call which is indicated if a FSK tone, a CNG tone, a fax answer tone, or a fax training tone is not detected.

29. The modem of claim 23, wherein the determination of whether the requested type of telephony service is permitted is accomplished by reading a permission bit associated with the requested type of telephony service.

30. The modem of claim 29, wherein the permission bit is located in a flash ROM.

31. The modem of claim 30, wherein the state of the permission bit can be remotely changed by an administrator via software.

32. The modem of claim 23, the microcontroller readable code further comprising code for causing the microcontroller to perform:
    setting the predetermined user-independent permission data.

33. The modem of claim 32, setting the predetermined user-independent permission data comprising:
    determining a user-dependent permission data; and
    storing the user-dependent permission data as the predetermined user-independent permission data.

* * * * *